(12) United States Patent
Steffier (10) Patent No.: US 6,979,490 B2
(45) Date of Patent: Dec. 27, 2005

(54) FIBER-REINFORCED CERAMIC COMPOSITE MATERIAL COMPRISING A MATRIX WITH A NANOLAYERED MICROSTRUCTURE

(76) Inventor: Wayne S. Steffier, 735 Alabama St., Huntington Beach, CA (US) 92648

( * ) Notice: Subject to any disclaimer, the term of this patent is extended or adjusted under 35 U.S.C. 154(b) by 74 days.

(21) Appl. No.: 10/261,475

(22) Filed: Sep. 30, 2002

(65) Prior Publication Data

US 2004/0033346 A1 Feb. 19, 2004
US 2005/0181192 A1 Feb. 19, 2004

Related U.S. Application Data

(63) Continuation-in-part of application No. 09/764,809, filed on Jan. 16, 2001, now abandoned.

(51) Int. Cl.[7] .......................... D04H 1/00; D04H 13/00; B32B 18/00; B32B 27/04
(52) U.S. Cl. ............................... 428/292.1; 428/294.1; 428/294.4; 428/297.4; 428/299.1; 428/367; 428/375; 428/378
(58) Field of Search .............................. 428/367, 292.1, 428/378, 375, 294.1, 294.4, 297.4, 299.1

(56) References Cited

U.S. PATENT DOCUMENTS

| | | | | |
|---|---|---|---|---|
| 5,026,604 A | * | 6/1991 | Thebault | 428/367 |
| 5,133,993 A | * | 7/1992 | Streckert et al. | 427/226 |
| 5,153,152 A | * | 10/1992 | Dawes et al. | 501/95.2 |
| 5,164,341 A | * | 11/1992 | Chyung et al. | 501/8 |
| 5,422,319 A | * | 6/1995 | Stempin et al. | 501/9 |
| 5,545,435 A | * | 8/1996 | Steffier | 427/249.3 |
| 5,723,213 A | * | 3/1998 | Carpenter et al. | 428/336 |
| 6,210,786 B1 | * | 4/2001 | Atmur et al. | 428/293.4 |
| 6,217,997 B1 | * | 4/2001 | Suyama et al. | 428/293.4 |

* cited by examiner

Primary Examiner—Rena Dye
Assistant Examiner—Camie S. Thompson
(74) Attorney, Agent, or Firm—Morland C. Fischer (57) ABSTRACT

A fiber-reinforced ceramic matrix composite material exhibiting increased matrix cracking strength and fracture toughness is produced by sequentially depositing a plurality of 5–500 nanometer-thick layers of a primary ceramic matrix material phase periodically separated by 1–100 nanometer-thick intermediate layers of a secondary matrix material phase onto the reinforcing fibers upon their consolidation. The resultant nanolayered matrix enhances the resistance to the onset of matrix cracking, thus increasing the useful design strength of the ceramic matrix composite material. The nanolayered microstructure of the matrix constituent also provides a unique resistance to matrix crack propagation. Through extensive inter-layer matrix fracture, debonding and slip, internal matrix microcracks are effectively diverted and/or blunted prior to their approach towards the reinforcing fiber, thus increasing the apparent toughness of the matrix constituent. This unique toughening mechanism serves to dampen energetic co-planar macrocrack propagation typically observed in conventionally manufactured ceramic matrix composites wherein matrix cracks are usually deflected at the fiber/matrix interphase region.

13 Claims, 6 Drawing Sheets

FIBER-REINFORCED CERAMIC COMPOSITE MATERIAL COMPRISING A MATRIX WITH A NANOLAYERED MICROSTRUCTURE

CROSS-REFERENCE TO RELATED APPLICATIONS

This application is a continuation-in-part of application Ser. No. 09/764,809 filed Jan. 16, 2001 now abandoned.

FIELD OF THE INVENTION

The present invention relates to a ceramic matrix composite material composed of a refractory fiber reinforcement, a fiber coating or fiber coating system, and a nanolayered ceramic matrix having increased matrix cracking strength and methods of producing same.

BACKGROUND OF THE INVENTION

Fiber-reinforced ceramic matrix composite materials are actively being developed for a variety of high-temperature military, aerospace and industrial applications. While possessing high specific strength and toughness, the utility of current ceramic matrix composites are severely limited by their susceptibility to oxidation embrittlement and strength degradation when stressed at or beyond their matrix cracking strength and exposed to high-temperature oxidation. Thus, for the current state of technology, the linear-elastic region represents the "useful" design stress-strain region due to the negative effects caused by environmental degradation of the fiber coating and/or reinforcing fiber at elevated temperatures following the onset of matrix cracking.

Ceramic materials have long been considered potentially beneficial for hot structural component applications in advanced gas turbine and rocket engines, and future high-speed aircraft and atmospheric re-entry vehicles. In general, ceramics have superior high-temperature strength and modulus while having a lower density than metallic materials. The principal disadvantages of ceramics as structural materials are their low failure strain, low fracture toughness and catastrophic brittle failure characteristics. Because of these inherent limitations, monolithic ceramics lack the properties of reliability and durability that are necessary for structural design acceptance. The emerging technology of fiber-reinforced ceramics, or ceramic matrix composites is one promising solution for overcoming the reliability and durability problems associated with monolithic ceramics. By incorporating high-strength, relatively high-modulus fibers into brittle ceramic matrices, combined high strength and high toughness composites can be obtained. Successfully produced ceramic matrix composites exhibit a high degree of non-linear stress-strain behavior with ultimate strengths, failure strains and fracture toughness that are substantially greater than that of the otherwise brittle ceramic matrix.

In order to exploit the benefits of fiber reinforcement in brittle ceramic matrices, it is well recognized that relatively weak fiber/matrix interfacial bond strength is essential for preventing catastrophic failure from propagating matrix cracks. The interface must provide sufficient fiber/matrix bonding for effective load transfer, but must be weak enough to debond and slip in the wake of matrix cracking, leaving the fibers to bridge the cracks and support the far-field applied load. Fiber-reinforced ceramic matrix composites with very high fiber/matrix interfacial bond strengths (usually the result of chemical interaction during manufacture) exhibit brittle failure characteristics similar to that of unreinforced monolithic ceramics by allowing matrix cracks to freely propagate directly through the reinforcing fibers. By reducing the interfacial bond strength, the fiber and matrix are able to debond and slip, thereby promoting the arrest and/or diversion of propagating matrix cracks at/or around the reinforcing fiber. Since crack inhibition/fracture toughness enhancement is the primary advantage of fiber-reinforced ceramic matrix composites, properly engineered fiber coating systems are thus essential for improving the structural performance of these materials. Control of interfacial bonding between the fiber and matrix following manufacture and during service is typically provided by the use of applied fiber coatings.

Fiber-reinforced ceramic matrix composites produced by the chemical vapor infiltration (CVI) process are a particularly promising class of engineered high-temperature structural materials, which are now commercially available. The principal advantage of the CVI process approach for fabricating ceramic composites as compared to other manufacturing methods (e.g., reaction bonding, hot-pressing, melt infiltration, or polymer impregnation/pyrolysis) is the ability to infiltrate and densify geometrically complex, multidirectional fiber preforms to near-net-shape with a ceramic matrix of high purity and controllable stoichiometry without chemically, thermally or mechanically damaging the relatively fragile reinforcing fibers. In addition, because it is a relatively low temperature manufacturing process, high purity refractory matrix materials can be formed (deposited) at a small fraction of their melting temperature ($\sim T_m/4$). Despite the many possible high-temperature ceramic matrix composite systems, however, the number of practical systems is limited by the currently available reinforcing fibers. To date, the majority of high performance ceramic matrix composites produced have primarily been fabricated using carbon and polymer-derived SiC (Nicalon and Hi-Nicalon) fiber reinforcement and CVI-derived SiC matrices.

Carbon fibers offer the highest temperature capability of all current commercially available refractory fibers. Carbon fiber-reinforced SiC ceramics (C/SiC), however, are susceptible to severe strength degradation when exposed to high-temperature oxidizing environments for prolonged periods. This limitation is due to the extensive process-induced matrix microcracking resulting from the relatively large thermal expansion mismatch between the carbon fiber reinforcement and the surrounding SiC matrix. The resultant matrix cracks provide access to environmental intrusion, particularly oxidation, which accelerates the degradation of the compliant fiber coating (e.g., pyrolytic carbon and boron nitride) and the reinforcing fiber. Commercially available small diameter ($\sim 15 \mu m$) ceramic fibers such as Nicalon and Hi-Nicalon microcrystalline SiC, although having limited elevated temperature capability (<1200° C. and <1400° C. respectively) as compared to carbon fiber, exhibit excellent thermomechanical compatibility with SiC matrices. These fibers thus produce composites which are not initially microcracked. Although these ceramic fibers are more oxidation resistant than carbon fibers, the resultant composites also experience irreversible oxidation embrittlement and strength degradation when stressed at or beyond their matrix cracking strength and subsequently exposed to high-temperature oxidation.

Unlike the near-linear tensile stress-strain behavior of the microcracked C/SiC material system, SiC fiber-reinforced SiC matrix composites (SiC/SiC) exhibit highly nonlinear stress-strain characteristics; controlled by the low matrix failure strain relative to the reinforcing fiber. As the composite is loaded in tension, it deforms linear-elastically up to the onset of matrix cracking. The tension threshold at which the onset of matrix cracking occurs designates the "proportional limit" of the material. That is, when the applied tensile strain reaches the failure strain of the unreinforced matrix, ideally assuming negligible residual thermoelastic effects, transverse matrix cracks initiate and propagate rapidly across the composite, leaving the fibers to bridge the cracks while supporting the far-field applied load. Continued loading beyond the onset of matrix cracking results in the formation of many regularly spaced matrix cracks (i.e., multiple matrix cracking) typically accompanied by a nonlinear decrease in composite stiffness. This strain-induced compliance behavior is the result of the diminishing contribution of the matrix modulus with increased multiple matrix cracking and fiber/matrix debonding. The diminishing stiffness behavior becomes more significant with increasing applied strain to the point where the elastic modulus of the composite is primarily dominated by the reinforcing fibers. As the composite strain approaches the fiber failure strain, the fibers progressively fracture, designating the ultimate strength of the composite. For most practical structural applications, however, the linear-elastic region represents the "useful" design stress-strain region due to the negative effects of hysteresis and environmental degradation of the fiber coating and/or fiber reinforcement at elevated temperatures occurring after matrix microcracking. Matrix microcracking is therefore a fundamental life-limiting issue for ceramic matrix composites being considered for use in extended-life thermostructural applications.

From an engineering mechanics standpoint, the high elastic modulus of the CVI-derived SiC matrix relative to the reinforcing fiber is a disadvantage for load transfer. For a Nicalon SiC fiber-reinforced/CVI SiC matrix composite with a 40 volume-percent fiber loading, nominally 70% of the applied load is carried by the matrix prior to the onset of matrix cracking. For an equal volumetric loading of higher modulus Hi-Nicalon SiC fiber, about 60% of the applied load is initially carried by the matrix. The relatively high matrix stiffness is thus a disadvantage from the standpoint of matrix microcracking. The tensile strain at which the onset of matrix cracking occurs in both Nicalon and Hi-Nicalon reinforced SiC matrix composites is typically ~0.04%, and rarely exceeds 0.05%, as this is an intrinsic property of the CVI-derived brittle matrix. The corresponding tensile matrix cracking strengths typically range between 60 and 80 MPa, respectively. In turn, the useful design strengths for both Nicalon and Hi-Nicalon SiC fiber-reinforced/CVI SiC composites are only about 30% of their respective fiber-dominated ultimate strengths. Thus, the early onset of matrix microcracking and subsequent oxidation embrittlement and strength degradation is a primary performance limitation of current state-of-the-art materials. Fundamentally, it would be desirable for a fiber-reinforced ceramic composite material to have a useful design strength significantly greater than 30% of its ultimate strength.

Although the oxidation embrittlement problem in fiber-reinforced ceramic matrix composite materials may eventually be controlled via advanced fiber coating and/or matrix oxidation inhibition approaches, it will nevertheless still be desirable to increase the elastic limit of the composite to reduce potential fatigue, hysteresis and other complex nonlinear material behavioral effects. Once the composite elastic limit is exceeded, the structural designer is faced with using a nonlinear and potentially time-dependent microcracked material system. One, however, nontrivial approach towards increasing the matrix cracking strength in ceramic matrix composites is by increasing the mechanical properties (e.g., strength and fracture toughness) of the matrix constituent. This approach has been successfully demonstrated by the current inventor via microstructural engineering of the SiC matrix into a strong/tough nanolayered composite constituent.

A nanolayered composite comprises a compositionally modulated microlaminate consisting of periodically alternating layers (lamellae) of two or more material constituents. The thickness of each layer range from about one molecular monolayer (~1 nm) to a thickness approaching the upper limit of very fine grain refinement achievable from current state-of-the-art materials processing techniques (>150 nm). These materials can be engineered to exhibit remarkable mechanical, tribological, thermal, and/or electrical properties that are uniquely different from those of the individual constituents. In particular, strength can be enhanced over currently available courser grained materials by an order of magnitude or more. Also of importance is that a conceivably wide range of refractory metal and ceramic materials can be engineered into such nanostructural composites suitable for extreme environmental structural applications.

Early efforts (over two decades ago) by researchers at the Chemetal/San Fernando Laboratories (SFL) led to the discovery of a unique form of chemical vapor deposited SiC. While attempting to deposit "massive" bodies of SiC, unanticipated thermochemical process instabilities (i.e., chugging) within the "cold-wall" chemical vapor deposition (CVD) reactor resulted in producing a material with an unusual layered microstructure. This material was found to be composed of alternating lamellae of SiC and elemental silicon (Si), ranging in thickness from 10 to 20 nm and 1 to 2 nm, respectively. Reported properties for this SiC/Si material included flexural strengths, elastic moduli, fracture toughness, and hardness which exceeded 4000 MPa, 450 GPa, 6–12 MPa√m, and 45 GPa, respectively. Numerous subsequent evaluations by government laboratory scientists Dutta, Graham, Rice, and Mendiratta confirmed these astonishing results. Dutta, S., R. Rice, H. Graham, and M. Mendiratta, *Characterization and Properties of Controlled Nucleation Thermochemical Deposited (CNTD) Silicon Carbide*, NASA TECH. MEMO. 79277, presented at the 80*th* Annual Meeting of the American Ceramic Society. This work resulted in the issuance of a number of domestic and foreign patents for which the process was coined "Controlled Nucleation Thermochemical Deposition", or CNTD.

Despite the extraordinary mechanical and physical properties of this termed "ultra-structured" material, however, commercialization was hindered by problems of reproducibility. In short, processing difficulties associated with the inability to control the naturally occurring chemical instability within the cold-wall reactor during deposition prevented this product from becoming commercially successful. Specifically, the uncontrollable, and not well-understood "cyclic" instability phenomenon was not easily scaled to larger or hot-wall reactors, resulting in low yield, poor reproducibility and poor process economics. Accordingly, it would be desirable to be able to artificially reproduce the beneficial effects of this CNTD process such that it could be effectively used in hot-wall CVD reactors (which can accommodate large batch quantities of dissimilar parts) by relatively simple and controllable mechanical means.

Figure 1:
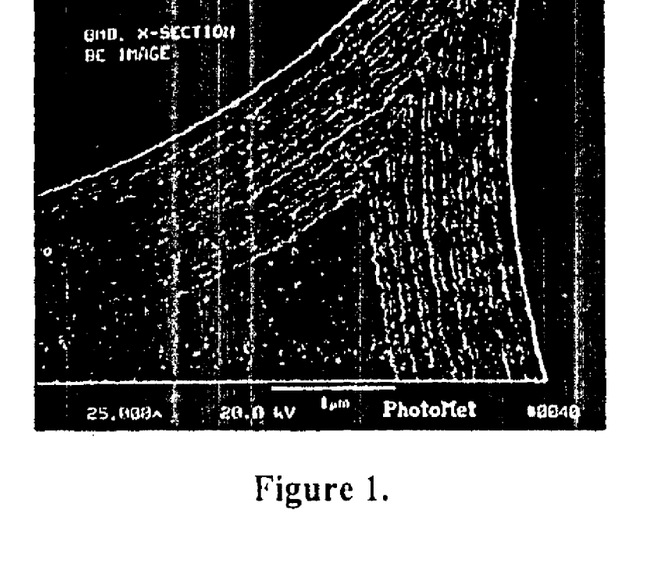
FIG. 1 shows a high magnification backscattered electron image of an advanced multilayered SiC fiber coating produced by chemical vapor infiltration.

It is also known that layered fiber coatings can be applied to fibrous preforms in such a way to increase the oxidation resistance of the resultant ceramic matrix composite, while preserving desirable strength and toughness. Particularly, by controlling the flow of the chemical precursors (i.e., chemically reactant precursor gases or gasified liquids) during application of a ceramic coating onto a preform of refractory fibers, wherein two or more independent chemical precursors are periodically turned on and off at prescribed intervals, it has been shown that the resultant microlayered coating produced creates an inherently oxidation-resistant fiber coating material. FIG. 1 shows a backscattered electron image (BEI) of an advanced "multilayered SiC fiber coating" developed by the current inventor and applied using the technique of cyclic "throttling" of the chemical precursors during the deposition of the fiber coating. Details of this multilayered fiber coating and processing method is more fully described in U.S. Pat. Nos. 5,455,106 and 5,545,435, the disclosures of which are incorporated herein by reference. The microlayered fiber coating system (deposited on a ~15 $\mu$m Hi-Nicalon SiC fiber) shown in FIG. 1 was engineered to mitigate the inherent problems of oxidation resistance plaguing currently available PyC and BN fiber coatings for structural ceramic matrix composites. This was achieved by successfully tailoring the desired mechanical characteristics (e.g., interfacial shear strength and compliance) of the multilayered SiC coating system via microstructural engineering necessary to enhanced strength and toughness of the resultant composite.

These patent disclosures, however, did not address the problem of increasing the strength and/or toughness of the matrix constituent itself and were directed instead to the product and method of depositing the oxidation-resistant multilayered ceramic fiber coating material. These patent disclosures describe depositing microlayers having a primary layer thickness of between 500 and 5000 nanometers, which is considered too thick to increase the inherent strength of the material produced as will be described later. Accordingly, it would be desirable to increase the strength and toughness of the ceramic matrix constituent in order to enhance the matrix cracking resistance in the resulting composite.

To better understand the unique behavior of CVI/CVD nanostructures, it is useful to briefly describe the morphology of these engineered materials. Nanolayered composites are produced by depositing a layer of the primary, or major constituent species with a thickness of on the order of a few tens of nanometers (10–100 nm), followed by a layer of minor species with a thickness of about an order of magnitude less (1–10 nm). Deposition durations for each layer are very short, ranging from a few seconds to a few tenths of a second. The exact deposition durations are dependent on the deposition rates of the respective major and minor species derived from a given process. The process is then cyclically repeated until the desired thickness of the body is achieved. Although there may appear to be great flexibility in the selection of the secondary nanolayering constituent(s), they must be carefully selected based on their (1) known ability to effectively interrupt the deposition epitaxy of the major constituent, thereby increasing strength and thermal shock resistance by controlling grain refinement; and (2) propensity to provide beneficial elastic modulus mismatch, thereby further increasing fracture toughness by limiting dislocation motion.

In conventional CVI/CVD-deposited materials, high-purity crystallites nucleate on the heated substrate surface (e.g., part to be coated or fibers) and then grow epitaxially in a direction perpendicular (i.e., normal) to the heated substrate; most often through the entire thickness of the deposit. The crystallites thus coarsen and weaken with increasing thickness during the growth process. In the current invention (e.g., CVI/CVD nanolayering process), the major disadvantages of conventional CVI/CVD are eliminated. The first crystallites nucleate and start to grow, competing for a preferred minimum energy orientation. Before they ever have a chance to become oriented, the growth is interrupted by the deposition of the second material. This secondary layer is deposited so thinly that its crystallites do not have a chance to grow, and thus do not achieve any preferred orientation. When the cycle is repeated, the crystallites of the primary material must re-nucleate and the process of nucleation/interruption is repeated; thus, the grains in the deposited material never have a chance to coarsen. When engineered successfully, this process has been shown to result in producing materials with significantly increased strength and hardness; beyond that predicted by the teachings of Hall-Petch. Crystals of about 5 $\mu$m are considered fine by most materials scientists and engineers; and those of 1 $\mu$m, extremely fine. Virtually no structural components have ever been produced by conventional methods with grains less than 0.4 $\mu$m (400 nm) in size. The CVI/CVD nanolayering process developed in the current invention provides the ability to produce highly uniform microstructures with grain sizes of between 1 and 100 nm. Although engineering properties are improved by grain refinement in general, it is not until the crystallites are maintained to less than ~150 nm that dramatic improvements to near-theoretical strengths are observed.

Figure 2:
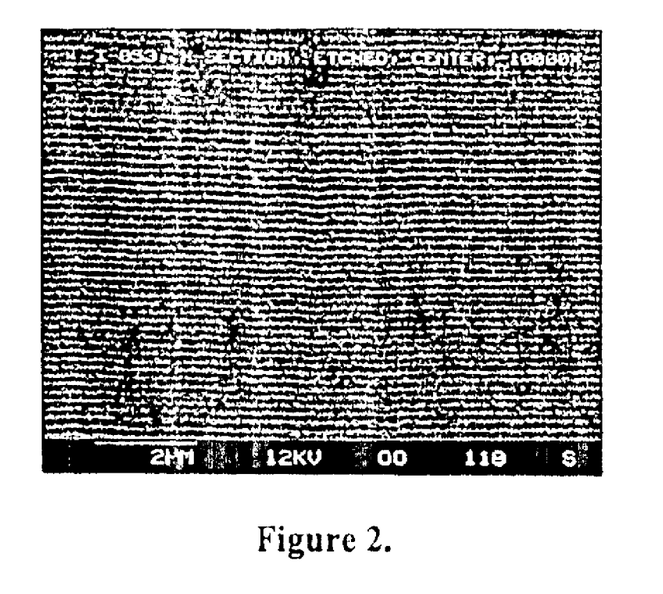
FIG. 2 shows a high magnification scanning electron micrograph of a nanolayered silicon carbide material produced by chemical vapor deposition.

FIG. 2 shows a microstructural example of a nanolayered CVD SiC material developed by the current inventor. A tensile strength enhancement of nearly one (1) order of magnitude (~8x) over conventional CVD SiC has been experimentally demonstrated.

SUMMARY OF THE INVENTION

The present invention comprises a novel material and manufacturing process for fabricating the same. The materials and process described herein results in producing a fiber-reinforced ceramic matrix composite material with increased resistance to matrix cracking. According to the invention, a matrix constituent with a nanolayered microstructure exhibiting increased strength and toughness is produced by sequentially depositing a plurality of thin layers of a primary ceramic matrix phase, interposed by a plurality of very thin intermediate layers of a secondary matrix phase onto the reinforcing fibers upon their consolidation.

Fiber-reinforcement is defined as any refractory fibers, continuous or discontinuous, used for producing a fibrous preform texture, which are capable of withstanding a use temperature of at least 800° C. in an atmosphere which is thermochemically compatible with that fiber without suffering fundamental chemical, physical or mechanical degradation. Examples include carbon fibers, silicon carbide fibers, silicon nitride fibers, aluminum oxide fibers, etc.

A fiber preform is a fibrous texture defined as any assemblage of one or more reinforcing fiber types produced by weaving, braiding, filament winding, fiber placement, felting, needling, or other textile fabrication process.

Fiber preforming is a textile fabrication process by which the collimated multifilamentary fiber bundles (i.e., tows) are placed and maintained in position for purposes of controlling both their orientation and content within a given volumetric space. As such, we will refer to this spatial arrangement of fibers as a preform architecture.

Fiber coating is defined as any refractory composition of either carbon, metal carbide, metal nitride, metal boride, metal silicide, metal oxide, or combinations thereof which is (are) deposited (for example by chemical vapor infiltration)

onto the refractory fibers either before or after fiber preforming for purposes of controlling the fiber/matrix interfacial bonding characteristics in the resultant composite. The resultant fiber coating thus encapsulates the reinforcing fibers. Examples include pyrolytic carbon, silicon carbide, silicon nitride, boron carbide, boron nitride, etc.; either as a single-layer phase, multilayered phase or as a phase of mixed composition. In one embodiment, the fiber coating system has a thickness of 0.05–5.0 micrometers.

Ceramic matrix is defined as any refractory composition of either carbon, metal carbide, metal nitride, metal boride, metal silicide, metal oxide, or combinations thereof which is subsequently deposited (for example by chemical vapor infiltration) onto the previously coated refractory fibers within the fibrous preform thereby encapsulating the fibers and consolidating the preform into the resultant densified composite. The reinforcing fibers of the fibrous preform thus become imbedded within and supported by the surrounding matrix. Examples include pyrolytic carbon, silicon carbide, boron carbide, silicon nitride, boron nitride, silicon boride, etc.; either as a single-phase or as a phase of mixed composition.

Nanolayered ceramic matrix is defined as any ceramic matrix with a compositionally modulated microstructure consisting of a plurality of very thin periodically alternating layers (lamellae) composed of two or more material constituents which is subsequently deposited (for example by chemical vapor infiltration) onto the previously coated refractory fibers within the fibrous preform thereby encapsulating the fibers and consolidating the preform into the resultant densified composite.

Chemical precursors are defined as any intermediate chemical(s) or presursory material(s) used in a process to form a resulting solid material upon thermochemical reaction. For processing methods of chemical vapor infiltration (CVI) and chemical vapor deposition (CVD), the chemical precursors used to deposit ceramic materials are usually gases or vaporized liquids.

DETAILED DESCRIPTION OF THE INVENTION

In the present invention, a fiber-reinforced ceramic matrix composite material with increased matrix cracking strength over currently available materials and a method for producing the same is described in detail with reference to the attached Figures. According to the present invention, a high-temperature fiber-reinforced ceramic matrix composite material exhibiting increased resistance to the onset of matrix cracking is produced by engineering the microstructure of the ceramic matrix constituent.

One embodiment of the present invention is a ceramic matrix composite material comprising a fibrous preform of refractory fibers, a fiber coating and a matrix with a nanolayered microstructure. The microstructure of the nanolayered ceramic matrix material comprises a plurality of primary phase layers of a first material and a plurality of secondary phase layers of a second material, wherein the secondary phase layers are interposed between the primary phase layers. Further, the nanolayered ceramic matrix encapsulates the coated refractory fibers and consolidates the fibrous preform into a densified composite.

Another embodiment of the present invention is a method for manufacturing a fiber-reinforced nanolayered ceramic matrix composite material comprising providing a fibrous reinforcing preform composed of refractory fibers, depositing (for example by chemical vapor infiltration) a fiber coating material onto the refractory fibers of the fibrous preform, and depositing (for example by chemical vapor infiltration) a nanolayered ceramic matrix material comprising a plurality of primary phase layers of a first material and a plurality of secondary phase layers of a second material, wherein the secondary phase layers are interposed between the primary phase layers. Further, the nanolayered ceramic matrix material is deposited such that it encapsulates the coated refractory fibers of the fibrous preform and consolidates the preform into a densified composite.

According to a manufacturing process of the current invention, a fibrous reinforcing preform is produced by weaving, braiding, filament winding, fiber placement, felting, needling, or other textile fabrication process using refractory fibers such as carbon fibers, silicon carbide fibers, silicon nitride fibers, aluminum oxide fibers, etc.

The fibrous preform is then generally fixtured in a suitable holding tool. Tooling serves to provide structural support to the otherwise flexible fiber preform thereby controlling and maintaining the desired geometry, dimensional tolerance(s) and/or fiber volume fraction of the preform prior to and following matrix consolidation. Suitable tooling materials should be selected on the basis of several considerations: (1) thermochemical stability in the fiber coating and matrix densification processes; (2) thermochemical and thermomechanical compatibility with the preform reinforcing fiber; (3) thermophysical stability for maintaining desired component geometry during and following materials processing; and (4) cost. Examples include graphite, molybdenum and stainless steel.

Following fabrication and fixturing of the fibrous preform, a fiber coating or fiber coating system is deposited (for example by chemical vapor infiltration) onto the preform. A method of depositing a suitable a multilayered fiber coating system onto a refractory fiber preform is disclosed in U.S. Pat. No. 5,455,106, the disclosure of which has been previously incorporated herein. If the reinforcing fibers have been coated prior to fibrous preforming (e.g., fiber-level coating), this processing step may not be necessary. The deposited fiber coating serves to control the desired fiber/matrix interfacial compliance and bonding characteristics in the resultant ceramic matrix composite. Examples of suitable fiber coatings include pyrolytic carbon, silicon carbide, silicon nitride, boron carbide, boron nitride, etc., either as a single-layer phase, multilayered phase or as a phase of mixed composition.

In a preferred method of the present invention the previously coated fibrous preform is consolidated with a nanolayered ceramic matrix. The microstructure of the nanolayered matrix consists of numerous very thin, periodically alternating layers (i.e., lamellae) of two or more material species, or phases. The nanolayered matrix constituent consists fundamentally of a primary phase material and a secondary phase material. Suitable examples for the primary phase material include silicon carbide, silicon nitride, boron carbide, etc., either as a single-phase, or as a phase of mixed composition. Suitable examples for the secondary phase material include pyrolytic carbon, silicon, silicon carbide, silicon nitride, boron carbide, boron nitride, etc., either as a single-layer phase, or as a phase of mixed composition.

In accordance with the teachings of the present invention, the nanolayered matrix is produced by depositing (for example by chemical vapor infiltration) a plurality of layers of a primary phase material with a thickness of on the order of a few tens of nanometers, followed by depositing (for example by chemical vapor infiltration) a plurality of layers of a secondary phase material with a thickness of about an order of magnitude less than that of the primary phase layers. The nanolayered matrix is thereby deposited such that the secondary phase material layers are interposed between the primary phase material layers. In a preferred embodiment, the thicknesses of the primary phase layers comprising the nanolayered ceramic matrix are between 5 and 500 nm, and the thicknesses of the secondary phase layers comprising the nanolayered ceramic matrix are between 1 and 100 nm. Thus, by interrupting grain growth and limiting the grain size to the thicknesses of the primary and secondary material layers, the present invention dramatically increases the resistance to the onset of matrix cracking in the resultant composite over that exhibited by an unlayered or microlayered matrix constituent.

EXAMPLE

A preferred method and resultant ceramic composite material of the present invention will now be described by way of example using a Hi-Nicalon silicon carbide (SiC) fiber-reinforced SiC matrix composite (SiC/SiC) material system produced by methods of chemical vapor infiltration (CVI). The SiC/SiC composite material system is selected for its desired nonlinear tensile stress-strain behavior and well-defined matrix cracking strength, or proportional limit. The CVI-based processing technique for fiber coating and matrix densification is selected for its ability to produce very high purity materials with outstanding control and uniformity of deposited material stoichiometry, morphology and thickness.

A first step in producing ceramic matrix composite materials according to the present invention is the fabrication of a suitable fiber reinforcing preform. For this example, fibrous preforms are fabricated by stacking 8 plies of plain weave Hi-Nicalon SiC woven fabric in a balanced and symmetric cross-ply $(0°/90°)_{2s}$ laminate orientation. Each dry (i.e., no resinous binders) laminated preform is then fixtured and flat-wise compacted in a graphite holding tool to maintain a fiber volume fraction of ~40% by controlling the preform thickness prior to subsequent composite processing.

An initial processing step in a preferred method of the present invention is the application of a suitable fiber coating or fiber coating system by methods of CVI onto the laminated fibrous preforms prior to their consolidation with the matrix material deposited by CVI or other suitable matrix formation process. As previously discussed, a fiber coating is required to impart the necessary fiber/matrix interfacial mechanical characteristics (e.g., low interfacial shear strength) to promote high strength and toughness in the resulting composite. For this example, two (2) suitably different fiber-coating materials, namely pyrolytic carbon (PyC) and pyrolytic boron nitride (BN), will be used independently for demonstrating the benefits of the nanolayered SiC matrix system. It has been found that PyC and BN coating thicknesses of ~0.4 μm and ~0.6 μm, respectively, result in near-optimum mechanical performance for CVI-based SiC/SiC composites. Thus for this example, PyC and BN fiber coatings will be applied to the laminated fabric preforms by CVI with thicknesses of ~0.4 μm and ~0.6 μm, respectively.

In the current example, the CVI-derived PyC fiber coating is produced in a high-temperature, low-pressure chemical vapor deposition (CVD) reactor by the thermal decomposition of a hydrocarbon-containing gas in the presence of hydrogen according to the following chemical reaction:

$$1/n\,C_nH_m + \alpha H_2 \rightarrow C + (m/2n + \alpha)H_2,$$

where $C_nH_m$ is the gaseous hydrocarbon reactant (i.e., methane, propane, propylene etc.) and α is defined as the molar ratio of $H_2$ to $C_nH_m$. At deposition temperatures between 1000–1400° C., the deposit is typically smooth laminar PyC, which has a hexagonal structure and, depending on the deposition temperature, has a density ranging between 1.8–2.0 g/cm³.

Further, the CVI-derived BN fiber coating is produced in a high-temperature, low-pressure CVD reactor by the hydrogen reduction of gaseous boron trichloride in the presence of ammonia according to the following chemical reaction:

$$BCl_3 + \eta NH_3 \rightarrow BN + (\eta - 1)NH_3 + 3HCl,$$

where η is defined as the molar ratio of $NH_3$ to $BCl_3$. At deposition temperatures between 800–1200° C., the deposit is typically amorphous and, depending on the deposition temperature, has a density ranging between 1.8–2.0 g/cm³. At temperatures above 1200° C., an increasingly crystalline deposit is obtained, until at around 1400° C. a crystalline BN is formed which has a hexagonal structure and a theoretical density of 2.2 g/cm³.

Following the application of the PyC and BN fiber coatings, the fixtured fiber preforms are prepared for matrix consolidation and densification processing. Baseline (i.e., unlayered matrix) SiC/SiC composites incorporating each the PyC and BN fiber coatings are also fabricated as experimental control in order to quantify the matrix cracking test results obtained on the respective nanolayered matrix composites of the present invention. The baseline unlayered SiC matrix is produced in a CVD reactor by the thermal decomposition of vaporized methyltrichlorosilane (MTS) using hydrogen as a carrier gas at elevated temperature and reduced pressure according to the following chemical reaction:

$$CH_3SiCl_3 + \alpha H_2 \rightarrow SiC + 3HCl + \alpha H_2,$$

where $\alpha$ is defined as the molar ratio of $H_2$ to $CH_3SiCl_3$. At deposition temperatures between 900–1300° C., the deposit is typically crystalline beta-SiC, which has a cubic structure and a theoretical density of 3.21 g/cm³. The laminated preforms should remain fixtured until an initial level of CVI SiC matrix is deposited to adequately rigidize the preforms. Upon rigidization, the external graphite tooling can be removed to enable matrix consolidation to continue on the freestanding preforms. CVI SiC densification processing is thus continued until a zero residual open porosity level is obtained in the resultant composite material.

In a preferred method, the nanolayered SiC matrix composite utilizes SiC as the primary or major matrix constituent phase and PyC as the secondary or minor matrix constituent phase. PyC is selected as the minor nanolayering constituent because of its known ability to effectively interrupt the epitaxial growth of vapor deposited SiC, while combining the benefits of extreme elastic modulus mismatch with SiC for reasons previously discussed. A suitable thickness of the major SiC constituent is less than 100 nm. A suitable selected thickness of the minor PyC constituent is about 5 nm. The layer thickness of the primary phase material will be substantially thicker than that of the secondary phase, generally to an order of magnitude or greater. The CVI SiC primary layers are deposited from vaporized methyltrichlorosilane (MTS) as previously described above, and the CVI PyC secondary, or interrupter layers, are produced by the thermal decomposition of methane, also as previously described. Both the CVI process temperature and pressure can generally be maintained constant throughout the deposition of the nanolayered matrix in order to provide overall simplicity and time-related economics to the process. In a preferred method of the present invention, primary and secondary constituent layer thicknesses can be precisely controlled by microprocessor-based cyclic throttling of the respective chemical precursors at prescribed time intervals. As discussed above, the appropriate time intervals will be dependant on the respective deposition rates of the primary and secondary phase matrix materials, and the nanolayer thicknesses desired and are readily determinable by one skilled in the art.

Figure 3:
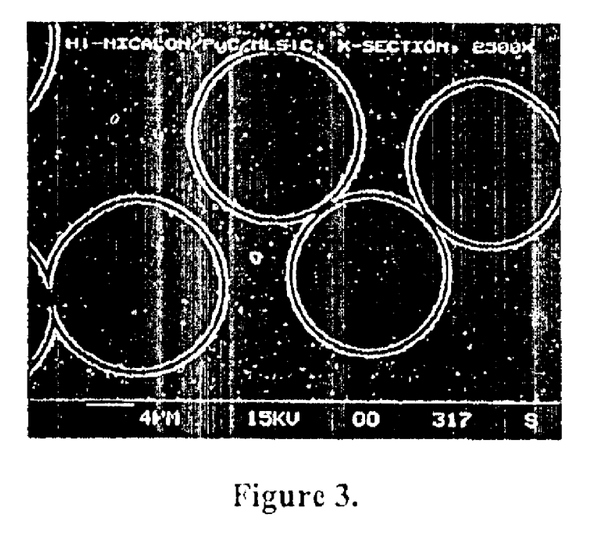
FIG. 3 shows a high magnification scanning electron micrograph of a fiber-reinforced nanolayered silicon carbide matrix composite material microstructure.

The laminated fiber preforms should remain fixtured until a level of CVI nanolayered SiC matrix is deposited to adequately rigidize the preforms. The external graphite tooling can then be removed upon rigidization to enable matrix consolidation to continue on the freestanding preforms. With the tooling fixtures removed, cyclic application of the primary and secondary matrix constituent materials is continued on the freestanding preforms until a zero residual open porosity level is obtained. FIG. 3 shows a typical scanning electron micrograph of a nanolayered SiC matrix composite microstructure.

Mechanical test specimens are then machined from each of the two (2) densified baseline and two (2) nanolayered SiC/SiC ceramic composite plates produced for experimental evaluation. Nine (9) replicate tensile test specimens from each of the four (4) SiC/SiC composite variants (e.g., two (2) fiber coatings and two (2) matrices) are prepared and instrumented with resistive foil gages for longitudinal strain measurement and adhesive-bonded end tabs for load introduction. In order to quantify the beneficial results of nanolayering the matrix microstructure on the matrix cracking strength, axial monotonic loading is performed at ambient conditions under an enforced displacement rate of 1.27 mm/min as per ASTM testing standards. An acoustic emission technique can be utilized during tensile testing to better establish and characterize the initial on-set of matrix cracking and multiple matrix fracture process signatures for the composite specimens tested. Data acquisition for this example demonstration included continuous tensile stress-strain curves and continuous strain-dependent acoustic matrix cracking signatures.

Figure 4:
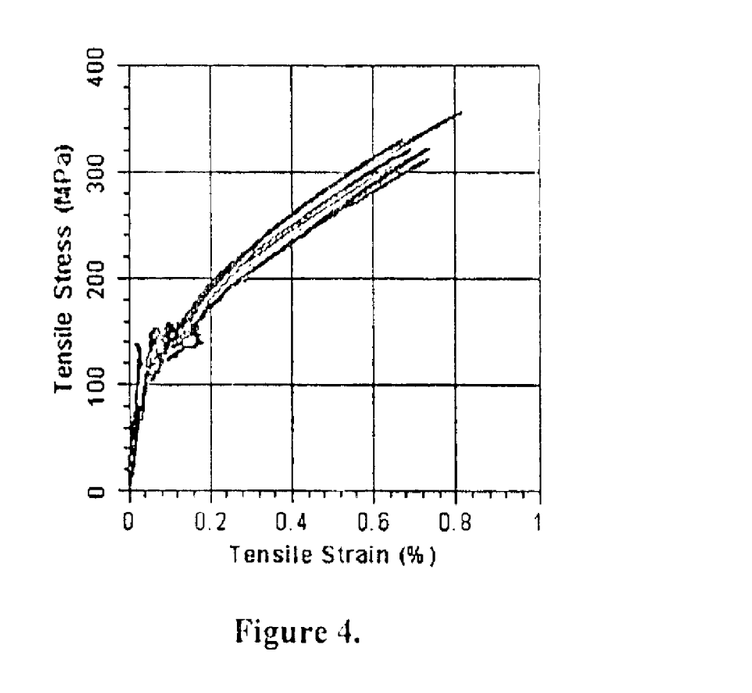
FIG. 4 shows experimental uniaxial tensile stress-strain curves acquired from a baseline non-layered Hi-Nicalon/CVI SiC composite material system with a PyC fiber coating.
Figure 5:
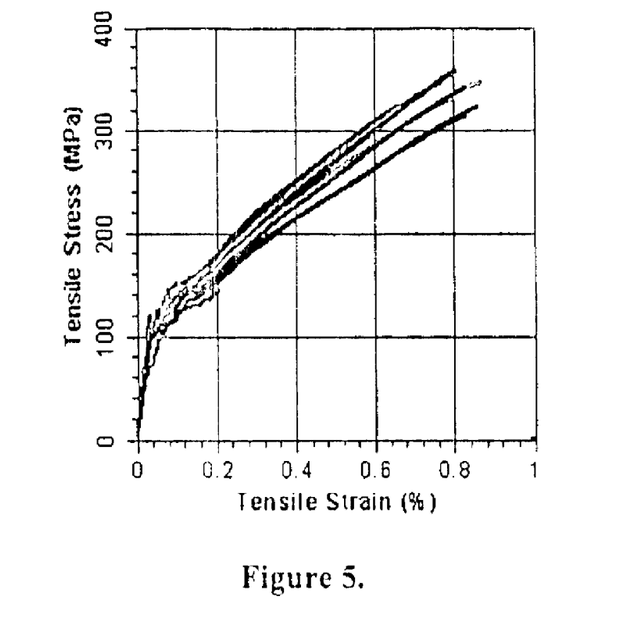
FIG. 5 shows experimental uniaxial tensile stress-strain curves acquired from a baseline non-layered Hi-Nicalon/CVI SiC composite material system with a BN fiber coating.

FIGS. 4 and 5 show experimental uniaxial tensile stress-strain curves (9 replicates each) acquired from the baseline Hi-Nicalon/non-layered SiC matrix composites with PyC and BN fiber coatings, respectively. As can be seen from these graphical figures, the overall stress-strain characteristics appear to be insensitive to the particular fiber coating system as both exhibit "classical" brittle-matrix composite stress-strain behavior. That is, both graphs exhibit a three (3) regime characteristic including: (1) an initial linear-elastic region, followed by (2) an erratic "knee" during early multiple matrix fracture, which then (3) terminates to a continuous nonlinear trajectory during the transition between latent matrix cracking, crack saturation and fiber debonding. For both conventional fiber-coating systems, deviation from elastic linearity, designating the onset of matrix cracking, consistently occurred at stress levels of about 80 MPa. The region immediately following the onset of matrix cracking is of particular interest because of the erratic behavior in the stress-strain characteristics. Each apparent stress "jumping" event is due to the formation and dynamic propagation (i.e., energy release) of relatively large matrix macrocracks which travel rapidly across the test specimen cross-section.

Figure 6:
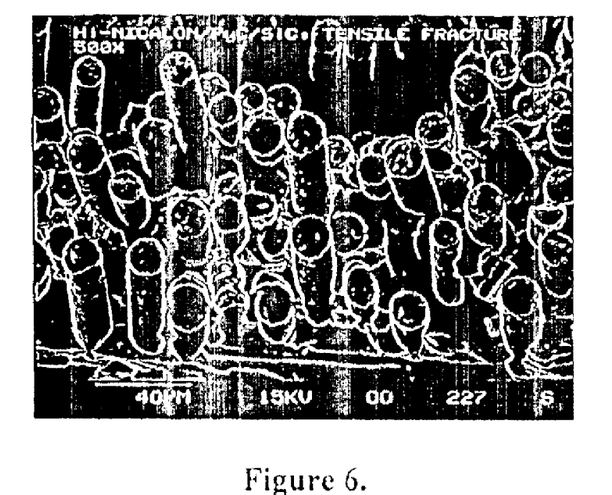
FIG. 6 shows the corresponding tensile fracture surface for a baseline non-layered Hi-Nicalon/CVI SiC composite material system with a PyC fiber coating.
Figure 7:
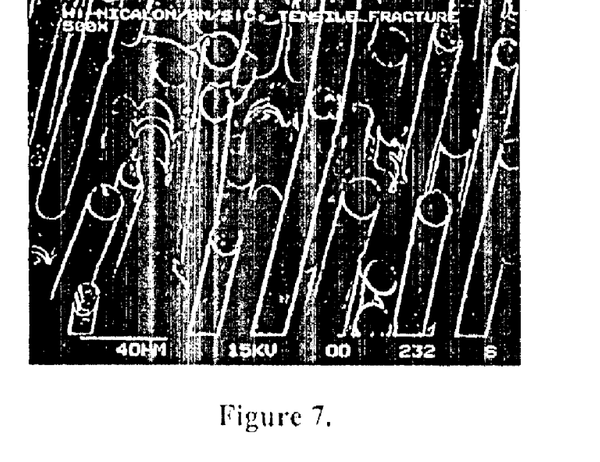
FIG. 7 shows the corresponding tensile fracture surface for a baseline non-layered Hi-Nicalon/CVI SiC composite material system with a BN fiber coating.

FIGS. 6 and 7 show the corresponding tensile fracture surfaces for the baseline PyC and BN fiber-coated SiC matrix composites, respectively. These high-magnification images depict a classical fracture morphology typical of successfully manufactured continuous fiber-reinforced ceramic composites as exhibited by limited matrix crack tortuosity and liberal fiber pullout.

Figure 8:
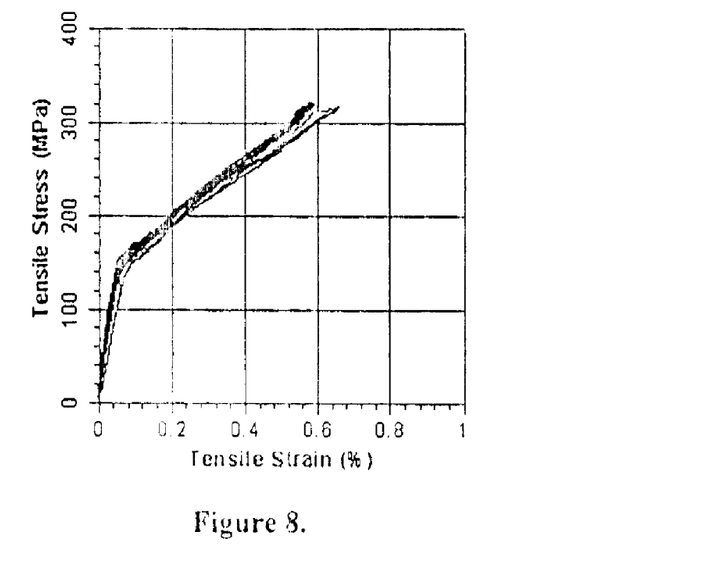
FIG. 8 shows experimental uniaxial tensile stress-strain curves acquired from a Hi-Nicalon/CVI SiC composite material system having a nanolayered matrix and a PyC fiber coating.
Figure 9:
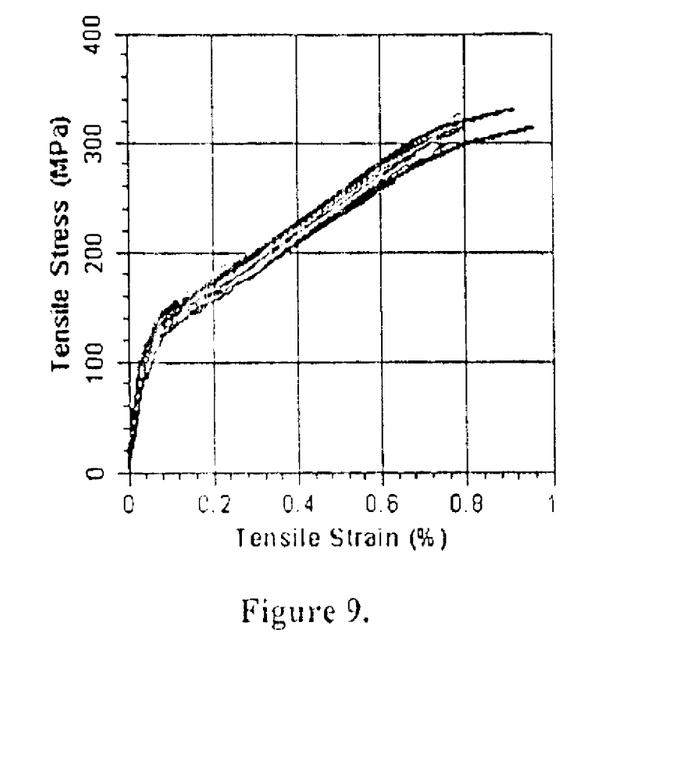
FIG. 9 shows experimental uniaxial tensile stress-strain curves acquired from a Hi-Nicalon/CVI SiC composite material system having a nanolayered matrix and a BN fiber coating.

In contrast, FIGS. 8 and 9 show the uniaxial tensile stress-strain curves (9 replicates each) acquired from Hi-Nicalon/nanolayered SiC matrix composites with PyC and BN fiber coatings, respectively, made in accordance with the teachings of the present invention. Deviation from linearity (e.g., onset of matrix cracking) in these cases occur at stress levels consistently above 100 Mpa. Of particular interest is that following the onset of matrix cracking, these composites exhibit a very smooth and rapid nonlinear stress-strain transition to a secondary linear region. This is believed to be due to the tortuosity of matrix crack propagation in the nanolayered matrix following the onset of cracking. That is, throughout the multiple matrix fracturing process, cracks which initiate at free surfaces (e.g., external and internal voids) must propagate towards the fiber through individual matrix layers via the shear lag mechanism. Because of combined compliance mismatch and low interfacial bond strength, these layers impede rapid co-planer crack propagation through extensive interlayer microcracking, debonding and displacement slip. Propagating internal matrix microcracks are thus effectively diverted and/or blunted prior to their approach towards the reinforcing fiber, serving to increase the apparent toughness of the matrix constituent. This mechanism effectively dampens energetic macrocrack propagation and resulting erratic stress-strain behavior typical in conventionally processed SiC matrix composites wherein matrix cracks are usually deflected at the fiber/matrix interphase region. The smooth continuous transition during early multiple matrix cracking shown in FIGS. 8 and 9 is likely due to the occurrence of a greater frequency of lower fracture energy release events through the thin matrix layers. These lower energy events aid in dampening the discrete jumps in stress by producing a greater density of fine matrix microcracks as opposed to fewer, more energetic macrocracks. Following the region of intense multiple matrix fracture, the stress-strain trajectories quickly recover, resulting in quasi-bilinear elastic behavior.

Figure 10:
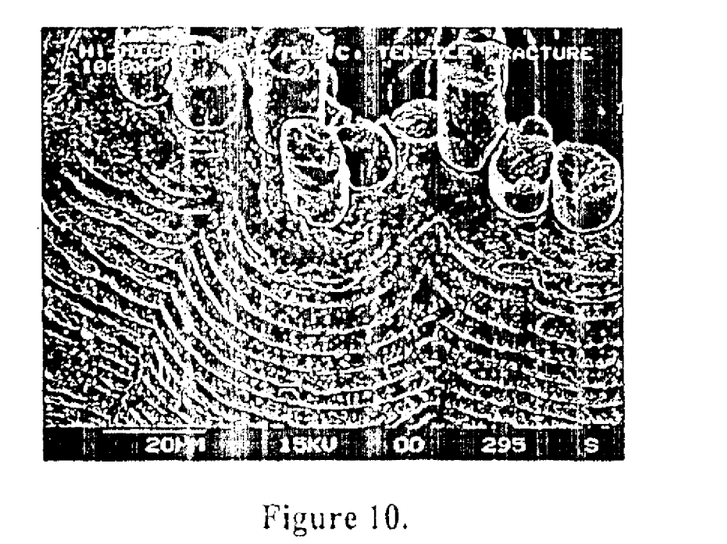
FIG. 10 shows the corresponding tensile fracture surface for a Hi-Nicalon/CVI SiC composite material system having nanolayered matrix and a PyC fiber coating.
Figure 11:
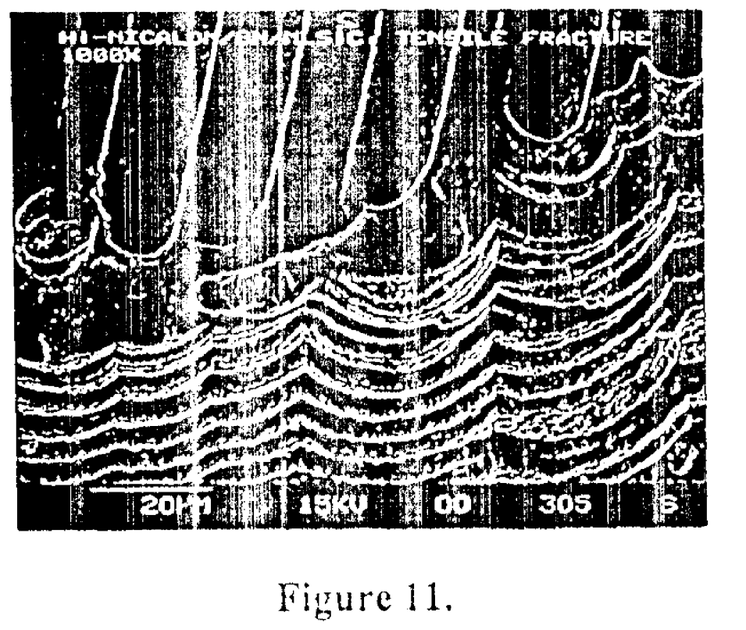
FIG. 11 show the corresponding tensile fracture surface for a Hi-Nicalon/CVI SiC composite material system having nanolayered matrix and a BN fiber coating.

FIGS. 10 and 11 show the corresponding tensile fracture surfaces for PyC and BN fiber coated nanolayered SiC matrix composites, respectively, produced in accordance with the teachings of the present invention described above. These images clearly show the unique and complex failure mechanisms afforded by the matrix nanolayering process of the present invention. The "stair-stepping" fracture morphology with extensive layer debonding and crack branching within the matrix layers can clearly be seen. Examination of the high-magnification scanning electron micrographs also shows that matrix microcrack propagation appears to "jump" between four and six discrete primary matrix layers. This is likely due to the magnitude of the strain energy that must be dissipated (i.e., released) during the propagation of internal fractures upon the formation of new surfaces. With similar reasoning, this interlayer crack propagation phenomenon may be a function of the applied strain rate wherein higher rates may result in greater discrete jumps. Unlike that of the baseline materials, these composites consistently exhibited highly irregular "cup-like" fracture surfaces. This apparent matrix crack tortuosity is indicative of a high level of matrix material toughness.

Table 1 summarizes the comparative tensile test results for the baseline non-layered Hi-Nicalon/CVI SiC composites as compared with the Hi-Nicalon/CVI SiC composites having a nanolayered matrix microstructure produced in accordance with the teachings of the present invention. As indicated by these results, the nanolayered SiC matrix composite of the present invention exhibits a consistent matrix cracking strength increase of over 30% for both PyC and BN fiber coatings as compared to that of the conventional un-layered SiC matrix composite baseline.

A nanolayered matrix composite material and a method for producing the same has been herein shown and described. While the preferred embodiments of the devices and methods have been described, they are merely illustrative of the principles of the invention. Other embodiments and configurations may be devised without departing from the spirit of the inventions and the scope of the appended claims.

TABLE 1

| | | Matrix System | | | |
| | | Baseline SiC** Fiber Coating System | | Nanolayered SiC** Fiber Coating System | |
| Material Properties* | Units | PyC | BN | PyC | BN |
| --- | --- | --- | --- | --- | --- |
| Fabric Areal Weight | g/m² | 280 | 280 | 280 | 280 |
| Fiber Density | g/cm³ | 2.74 | 2.74 | 2.74 | 2.74 |
| Fiber Volume Fraction | % | 29.0 (1.4) | 31.5 (1.5) | 29.8 (1.0) | 33.0 (1.1) |
| Fiber Coating Thickness | μm | ~0.4 | ~0.6 | ~0.4 | ~0.6 |
| Fiber Coating Fraction | % | 3.2 (0.2) | 5.2 (0.3) | 3.3 (0.1) | 5.5 (0.2) |
| Theoretical Density | g/cm³ | 3.06 (0.01) | 3.06 (0.01) | 3.06 (0.01) | 3.05 (0.01) |
| Measured Bulk Density | g/cm³ | 2.71 (0.04) | 2.68 (0.02) | 2.67 (0.05) | 2.54 (0.04) |
| Residual Porosity | % | 11.7 (1.3) | 12.4 (0.8) | 12.8 (1.7) | 12.5 (1.3) |
| Matrix Layer Thickness | nm | — | — | ~100 | ~100 |
| Matrix Cracking Strength | MPa | 81.2 (10.3) | 80.0 (11.2) | 106.1 (8.9) | 104.1 (11.9) |
| Cracking Strength Increase | % | — | — | 30.7 | 30.1 |
| Ultimate Tensile Strength | MPa | 318.6 (26.2) | 332.3 (17.2) | 298.6 (20.5) | 307.0 (14.1) |
| Tensile Failure Strain | % | 0.68 (0.09) | 0.79 (0.09) | 0.57 (0.06) | 0.80 (0.03) |
| Tensile Elastic Modulus | GPa | 322.8 (85.3) | 271.1 (19.3) | 277.0 (61.8) | 293.5 (67.4) |
| Number of Replicate Tests | — | 9 | 9 | 9 | 9 |

*Average Value (Standard Deviation)
**Plain-Weave Fabric, 8-Ply (0/90) Laminate

What is claimed is:

1. A fiber-reinforced ceramic matrix composite material having enhanced matrix cracking strength, comprising:
   a fibrous preform of refractory fibers;
   a fiber coating material which fully encapsulates the refractory fibers of said fibrous perform; and
   a high-strength, nanolayered ceramic matrix which fully encapsulates and consolidates the refractory fibers of said fibrous preform into a densified composite, said nanolayered ceramic matrix having a microstructure comprising a plurality of primary phase layers being formed from a first material and having a thickness of between 5 and 500 nm, and a plurality of secondary phase layers being formed from a second material and having a thickness of between 1 and 100 nm, wherein said plurality of secondary phase layers are interposed between said plurality of primary phase layers, such that the tensile matrix cracking strength of said ceramic matrix composite material is greater than 100 Mpa,
   said fiber coating material debonding said nanolayered ceramic matrix from the refractory fibers of said fibrous perform.

2. The fiber-reinforced ceramic matrix composite material recited in claim 1, wherein the first material from which said plurality of primary phase layers of said nanolayered ceramic matrix formed is selected from a group of materials consisting of silicon, silicon carbide, boron carbide, tantalum carbide, hafnium carbide, zirconium carbide, silicon nitride, tantalum nitride, hafnium nitride, zirconium nitride, titanium nitride, silicon boride, tantalum boride, hafnium boride, zirconium boride, titanium boride, zirconium silicide, titanium silicide, molybdenum silicide, aluminum oxide, silicon oxide, hafnium oxide, zirconium oxide, and titanium oxide.

3. The fiber-reinforced ceramic matrix composite material recited in claim 1, wherein the second material from which said plurality of secondary phase layers of said nanolayered ceramic matrix is formed is selected from a group of materials consisting of carbon, silicon, silicon carbide, boron carbide, tantalum carbide, hafnium carbide, zirconium carbide, silicon nitride, boron nitride, tantalum nitride, hafnium nitride, zirconium nitride, titanium nitride, aluminum nitride, silicon boride, tantalum boride, hafnium boride, zirconium boride, titanium boride, zirconium silicide, titanium silicide, molybdenum silicide, aluminum oxide, silicon oxide, hafnium oxide, zirconium oxide, and titanium oxide.

4. The fiber-reinforced ceramic matrix composite material recited in claim 1, wherein each of the plurality of primary phase layers of said nanolayered ceramic matrix is formed from the same material.

5. The fiber-reinforced ceramic matrix composite material recited in claim 1, wherein each of the plurality of secondary phase layers of said nanolayered ceramic matrix is formed from the same material.

6. The fiber-reinforced ceramic matrix composite material recited in claim 1, wherein the first material of said plurality of primary phase layers of said nanolayered ceramic matrix is a crystalline material, the second material of said plurality of secondary phase layers being capable of interrupting the growth of the crystallites of the first crystalline material of said primary phase layers.

7. The fiber-reinforced ceramic matrix composite material recited in claim 1, wherein the refractory fibers of said fibrous preform are selected from a group of fiber materials consisting of silicon carbide, silicon nitride, aluminum oxide, and any other matrix thermal expansion-compatible fiber material that is capable of withstanding a temperature in excess of 800° C.

8. The fiber-reinforced ceramic matrix composite material recited in claim 1, wherein the fiber coating material which encapsulates the refractory fibers of said fibrous perform is a coating having a thickness of between 0.05 and 5.0 micrometers and being selected from a group of fiber coating materials consisting of carbon, silicon carbide, boron carbide, tantalum carbide, hafnium carbide, zirconium carbide, silicon nitride, boron nitride, tantalum nitride, hafnium nitride, zirconium nitride, titanium nitride, aluminum nitride, silicon boride, tantalum boride, hafnium boride, zirconium boride, titanium boride, zirconium silicide, titanium silicide, molybdenum silicide, aluminum oxide, silicon oxide, hafnium oxide, zirconium oxide, and titanium oxide.

9. The fiber-reinforced ceramic matrix composite material recited in claim 8, wherein said fiber coating material consists of a single-layer phase of uniform composition.

10. The fiber-reinforced ceramic matrix composite material recited in claim 8, wherein said fiber coating material consists of a single-layer phase of mixed composition.

11. The fiber-reinforced ceramic matrix composite material recited in claim 8, wherein said fiber coating material consists of a multilayered phase including alternating coating layers having respective fiber coating compositions.

12. A fiber-reinforced ceramic matrix composite material having enhanced matrix cracking strength, comprising:
   a fibrous preform of refractory fibers;
   a high-strength, nanolayered ceramic matrix which fully encapsulates the refractory fibers of said fibrous preform into a densified composite, said nanolayered ceramic matrix having a microstructure including a plurality of primary phase layers being formed from the same first crystalline material and a plurality of secondary phase layers being formed from the same second material, said second material being different from said first material and being capable of interrupting the growth of the crystallites of said first crystalline material, and said plurality of secondary phase layers being interposed between said plurality of primary phase layers such that the tensile matrix cracking strength of said ceramic matrix composite material is greater than 100 Mpa; and
   a debonding layer to debond said nanolayered ceramic matrix from the refractory fibers of said fibrous perform.

13. The fiber-reinforced ceramic matrix composite material recited in claim 12, wherein the first crystalline material from which said plurality of primary phase layers are formed is silicon carbide.

* * * * *